Fig. 1

Patented May 3, 1949

2,469,142

UNITED STATES PATENT OFFICE 2,469,142

AIR CONDITIONING

Sven W. E. Andersson, Evansville, Ind., assignor to Servel, Inc., New York, N. Y., a corporation of Delaware Application December 22, 1945, Serial No. 636,977

12 Claims. (Cl. 257—3)

The present invention relates to a control system for an all year air conditioning unit. More particularly the invention relates to improvements in a control system of the type illustrated and described in my prior U. S. Letters Patent No. 2,381,427 dated August 7, 1945, entitled Air conditioning.

The air conditioning unit illustrated in my prior patent comprises a heating system having a heating element, a heat operated refrigeration system having a cooling element, a single source of heat to operate the heating system or heat operated refrigeration system, and a blower for circulating air to be conditioned over the heating and cooling elements. The control for the air conditioning unit comprises electric circuits and a switch box in the enclosure to be conditioned having one switch to select the heating system circuits for operation, a second switch for selecting the heat operated refrigeration system circuits for operation, and a third switch to select the blower circuit for operation independently of the heating or cooling system. If the first switch is actuated the heating system and blower will be operated concurrently when a room thermostat calls for heating and if the second switch is actuated the refrigeration system and blower will be operated concurrently when the room thermostat calls for cooling.

One of the objects of the present invention is to provide a control for an air conditioning unit of the type indicated with a single double throw switch to select the heating system circuits for operation in one position, select the refrigeration circuits for operation in another position and open the circuits at an intermediate position.

Another object is to provide a control of the type indicated having a thermostatically operated switch means cooperating with the double throw selector switch to complete circuits for initiating operation of the refrigeration system upon a rise in temperature and complete circuits for initiating operation of the heating system upon a fall in temperature.

Another object is to provide an electric control of the type indicated for initiating the operation of a plurality of heating burners in the same sequence when either the heating or refrigeration system is selected for operation.

Another object is to provide an electric control of the type indicated which is operable to delay the operation of the blower until the heating element is hot when the heating system is selected for operation.

Another object is to provide an electric control for an air conditioning unit of the type indicated which is operable to simultaneously initiate operation of the refrigeration system and blower when the refrigeration system is selected for operation and delay operation of the blower until the heating element is hot when the heating system is selected for operation.

Another object is to provide an electric control for an air conditioning unit of the type indicated which is operable to delay the supply of cooling water to the refrigeration system until heating medium has been supplied thereto.

Another object is to provide an electric control of the type indicated for delaying operation of the blower when the heating system is selected for operation and for delaying the supply of cooling water to the refrigeration system when the refrigeration system is selected for operation.

Still another object is to provide an electric control of the type indicated having a relatively compact construction and arrangement of operative elements and adapted for easy service and repair.

These and other objects will become more apparent from the following description and drawings in which like reference characters denote like parts throughout the several views. In the drawings.

Figure 1:
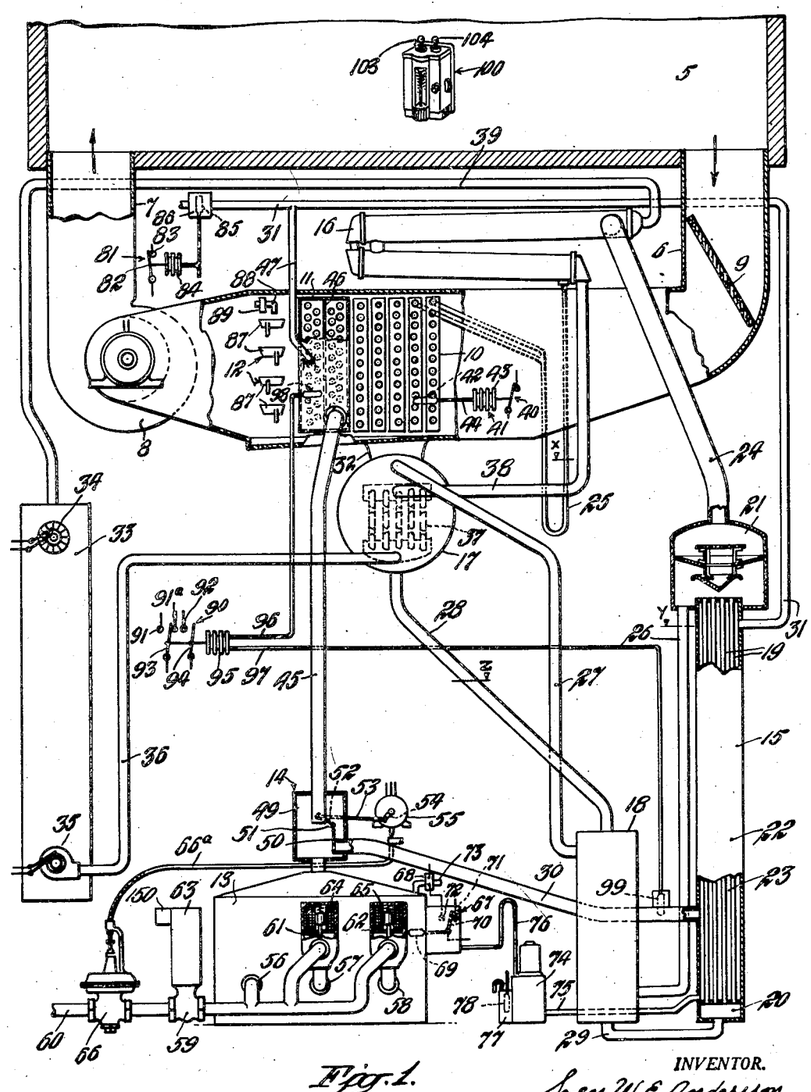
Fig. 1 is a diagrammatical view of an air conditioning unit showing the elements to be controlled by the control system.

Referring to the drawings, Fig. 1 illustrates an enclosure 5 to be conditioned and an air conditioning unit comprising a conduit 6 for receiving air from the enclosure and a conduit 7 for delivering air to the enclosure. It is to be understood that in an actual installation the conduits will be arranged in a different manner from that herein shown and that provisions may be made to supply fresh air to the air recirculated through the enclosure 5 and the conduits 6 and 7. The air to be conditioned is circulated through the conduits 6 and 7 in the direction indicated by the arrows by means of a blower 8. As the air flows through the conduit 6 it is conditioned by elements mounted therein comprising a filter 9, a cooling element 10, a heating element 11, and a humidifier 12. The cooling element 10 constitutes the evaporator of a heat operated absorption refrigeration system while the heating element 11 constitutes the radiator of a steam heating system. Both the refrigeration system and the heating system are selectively supplied with steam from a boiler 13 constituting a single source of heat; and the supplying of heating steam to the selected system is controlled by a diverter valve 14.

The heat operated absorption refrigeration system is preferably of the type illustrated and described in the United States Letters Patent No. 2,282,503 of Albert R. Thomas, issued May 12, 1942, entitled Refrigeration. Such an absorption refrigeration system operates in a partial vacuum and utilizes water as a refrigerant and a salt solution as an absorbent. Suffice it to state herein that the refrigeration system comprises a generator 15, a condenser 16, evaporator 10, absorbed 17 and heat exchanger 18, interconnected to provide a closed circuit. The generator 15 has a series of upright tubes 19 connected at their lower end to an inlet chamber 20 for absorption solution and connected at their upper ends to a separting chamber 21. Surrounding the tubes 19 is a shell 22 providing a heating chamber 23 therebetween. Separting chamber 21 is connected to the condenser 16 by a conduit 24 and the condenser, in turn, is connected to the evaporator 10 by a depending U-shaped conduit 25. The evaporator 10 communicates with the absorber 17 through passages or headers 32 in the manner illustrated and described in detail in the Thomas patent referred to above. Absorption solution weak in refrigerant, or in other words, a concentrated salt solution flows from the separating chamber 21 to the top of absorber 17 in a path of flow including the conduit 26, heat exchanger 18, and conduit 27. Absorption solution strong in refrigerant or, in other words, dilute salt solution flows from the bottom of the absorber 17 to the inlet chamber 20 at the bottom of the generator 15 in a path of flow including the conduit 28, heat exchanger 18 and conduit 29.

Steam is supplied from the boiler 13 to the heating chamber 23 of the generator 15 through a conduit 30. A vent tube 31 is connected at one end to the heating chamber 23 of the generator 15 adjacent the top thereof and the other end of the vent tube is opened to the atmosphere so that steam will be supplied to the generator at atmospheric pressure. If all of the steam supplied to the generator 15 is not condensed in the heating chamber 23 due to faulty heat transfer through the tubes 19 resulting from scale or the like, steam will escape through the vent tube 31.

The absorber 17 and condenser 16 are cooled by cooling water from any suitable source such as the cooling tower 33 illustrated in the drawings. The cooling tower 33 may be of any suitable construction wherein a stream of water descends by gravity through the tower simultaneously with the flow of a stream of air upwardly through the tower in direct contact therewith to evaporate a portion of the water and reduce its temperature by the removal of the heat of vaporization. An electric motor driven fan 34 is provided adjacent the upper end of the cooling tower 33 to induce a flow of air upwardly therethrough and an electric motor driven pump 35 is provided at the bottom of the tower to circulate cooled water through the absorber 17 and condenser 16 of the refrigeration system. For this latter purpose a conduit 36 connects the pump 35 to the bottom of a series of cooling coils 37 in the absorber 17. The cooling water discharged from the top of the cooling coils 37 in the absorber 17 flows through a conduit 38 to the condenser 16 and then from the condenser 16 through the conduit 39 back to the top of the cooling tower 33.

When steam is supplied to the heating chamber 23 of the generator 15 the refrigerant, water, is vaporized from absorption solution in the tubes 19 by heat transferred through the walls thereof. As the refrigerant vapor rises in the tubes 19, it raises absorption solution into the separating chamber 21 by vapor lift action. The absorption solution in the separating chamber 21 flows to the top of the absorber 17 through the conduit 26, heat exchanger 18 and conduit 27. The refrigerant vapor flows from the separating chamber 21 through the conduit 24 to the condenser 16 where it is liquefied by the transfer of its heat of vaporization to the cooling medium from the cooling tower 33. The liquid refrigerant flows by gravity from the condenser 16 into the U-shaped conduit 25 and from the latter into the evaporator 10. Due to the absorption of refrigerant vapor in the absorber 17, a relatively low pressure, 7 to 10 mm. Hg, is maintained in the evaporator 10. At this low pressure the refrigerant, water, evaporates at a low temperature of 45° F. to 50° F. as it flows through the evaporator 10. As the heat for vaporizing the refrigerant is supplied from the ambient, a refrigerating effect is produced. The absorption solution in the absorber 17, enriched with the refrigerant vapor absorbed therein, flows back to the inlet chamber 20 of the generator 15 through the conduit 28, heat exchanger 18 and conduit 29 to complete the cyclic paths of flow for the refrigerant and absorbent. The pressure differential in the system is maintained by a column of liquid refrigerant in the U-shaped conduit 25 constituting a liquid trap and liquid columns in the conduits 27 and 28 between the generator 15 and absorber 17. For purposes of illustration the liquid levels in the conduits 25, 26 and 28 are indicated by the reference characters $x$, $y$ and $z$.

As shown diagrammatically in Fig. 1, a low temperature cut-out switch 40 is provided for interrupting the operation of the refrigeration system if the temperature in the evaporator 10 falls below a predetermined value. The switch 40 is normally closed and operated to open position by a thermostat 41 responsive to the temperature of the refrigerant in the evaporator 10. The thermostat may be of any suitable construction and as illustrated comprises a bulb 42 positioned in a well in the evaporator 10 and connected to a bellows 43 by a capillary tube 44. The bellows 43 contains vapor which condenses in the bulb 42 when the temperature in the evaporator is too low to contract the bellows and the latter is connected to the movable contact of the low temperature cut-out switch 40.

The heating system comprises the radiator 11 and a conduit 45 connecting the radiator to the boiler 13. The radiator 11 has division walls 46 therein to cause the heating steam to successively pass through different sections of the radiator in series. A vent pipe 47 connects the end of the last section of the radiator 11 with the vent pipe 31 so that steam is supplied to the radiator at atmospheric pressure. All of the steam supplied to the radiator 11 condenses therein unless there is faulty heat transfer due to dirt or scale in the radiator or a dirty filter 9 and under such conditions steam will escape through the vent pipe 47 to the atmosphere.

Steam is supplied to either the refrigeration system or heating system by the diverter valve 14 comprising a valve body in the form of a steam box or chamber 49 and a valve element 50. The steam box 49 may be mounted on the boiler 13 and the ends of the conduits 30 and 45 for supplying steam to the refrigeration system and heating system, respectively, project into the steam box at right angles to each other. The valve element 50 is mounted on a rod 51 journaled in the sides of the chamber 49. A crank arm 52 fast on the pivot rod 51 at the outside of the chamber 50 is connected through a link 53 to a crank arm 54 on the shaft of a two position electric motor 55. The motor 55 may be of any suitable type and as illustrated has a field winding 132, connected in series with limit switches LS and LSa, see Fig. 2, the switches being operated by the rotor to open one or the other alternately at each half revolution of the output shaft. The arrangement of the ends of the steam pipes 30 and 45 is such that the valve element 50 will alternately close one of the steam pipes and open the other when moved from one to the other of its two positions. In the position illustrated in Fig. 1 the valve element 50 closes the steam supply pipe 30 and opens the steam supply pipe 45 to render the heating system operative for heating.

The boiler 13 may be heated by any suitable fluid fuel burners such as the plurality of gas burners 56, 57 and 58 as illustrated. The flow of gas fuel to the burners 56, 57 and 58 is controlled by a master valve 59 in the fuel supply line 60 and by individual control valves 61 and 62 for the burners 57 and 58. The valves are automatically closed by suitable springs and the master valve 59 is opened by an electric motor indicated by the reference character 63 while the valves 61 and 62 are opened by individual solenoids 64 and 65. The special motor operated master valve 59 is used in the fuel supply line 60 to insure positive starting and stopping the flow of fuel to the burners. More heat is required by the heating system to heat the air than is required by the refrigeration system to cool the air and for this purpose a gas pressure regulator 66 is provided in the fuel supply line 60. Preferably the gas pressure regulator is of the type illustrated and described in my prior U. S. Letters Patent No. 2,356,556, issued August 22, 1944, and entitled Regulator. The gas pressure regulator 66 is operated by the motor 55 through a Bowden wire 66a.

A low water cut-out unit 67 mounted on the side of the boiler 13 is adapted to open the electrical control circuit for the gas burners 56, 57 and 58 and close the circuit for a magnetically operated water valve 68 when the water level in the boiler is too low. The low water cut-out unit 67 comprises a float 69 responsive to the liquid level in the boiler 13 for holding a movable contact 70 in engagement with a fixed contact 71 when the level of the water in the boiler is sufficiently high and for actuating the movable contact 70 into engagement with a fixed contact 72 when the level of the water is too low. As illustrated in the drawings, the contact 72 is connected to the magnetically operated water valve 68 in a supply pipe 73.

Condensate from the radiator 11 of the heating system drains by gravity through the steam pipe 45 back to the boiler 13. However, condensate in the heating chamber 23 of the generator 15 is below the water level in the boiler 13 and is returned to the boiler by an electric motor-operated condensate return pump 74. The condensate return pump 74 is connected to the bottom of the steam chamber 23 by a conduit 75 and the outlet from the pump is connected to the boiler 13 by a conduit 76 having a portion extending upwardly above the water level in the boiler. If for any reason the condensate return pump 74 fails to operate, the condensate will overflow into a chamber 77 containing a thermal responsive element 78.

A normally closed thermostatically operated cut-out switch 81 cooperates with the heating and cooling systems and the condensate return pump 74. The cut-out switch 81 has a movable contact 82 engageable with a fixed contact 83 and the movable contact is connected to a thermostat bellows 84. The bellows 84, in turn, is operated by the vapor pressure of a volatile liquid in the bulb 78 in the overflow chamber 77 of the condensate return pump 74 or a bulb 85 in a chamber 86 connected in the vent pipe 31. Thus, the escape of steam from either the radiator 11 of the heating system or heating chamber 23 of the refrigeration system or overflow of condensate from the pump 74 will operate the bellows 84 to open the cut-out switch 81.

The humidifier 12 comprises a series of vertically spaced pans 87, a water supply line 88 and an electromagnetically operated water valve 89. Overflow pipes in each of the pans 87 supply water to each of the successively lower pans and drains water from the lowermost pan into a suitable sump in the conduit 6. The sump is also adapted to collect condensate removed from the air by the evaporator 10. As thus far described the air conditioning unit is substantially identical with that illustrated and described in my prior Patent No. 2,381,427 referred to above.

In accordance with the present invention a delayed action control switch 90 is provided for delaying operation of the blower 8 until the heating radiator 11 is hot when the heating system is selected for operation; and for delaying operation of the cooling tower 33 and condensate return pump 74 until the generator is hot when the refrigeration system is selected for operation. The delayed action control switch 90 comprises fixed contacts 91, 91a and 92 and a pair of movable contacts 93 and 94 connected for simultaneous operation by the expansible bellows 95 of a thermostat. The bellows 95 is connected by capillary tubes 96 and 97 to thermosensitive bulbs 98 and 99 located in the radiator 11 of the heating system and steam supply pipe 30 for the generator 15 of the refrigeration system, respectively. The bulbs 98 and 99 contain a volatile liquid which is vaporized when steam is supplied to the radiator 11 or to the generator 15 and exerts pressure to expand the bellows 95 and operate the movable contact 93 from engagement with the fixed contact 91a into engagement with the contact 91 and the contact 94 into engagement with the fixed contact 92. The arrangement of the switch 90 in the control system to delay operation of the blower 8 and cooling tower 33 will appear from the following description.

Figure 2:
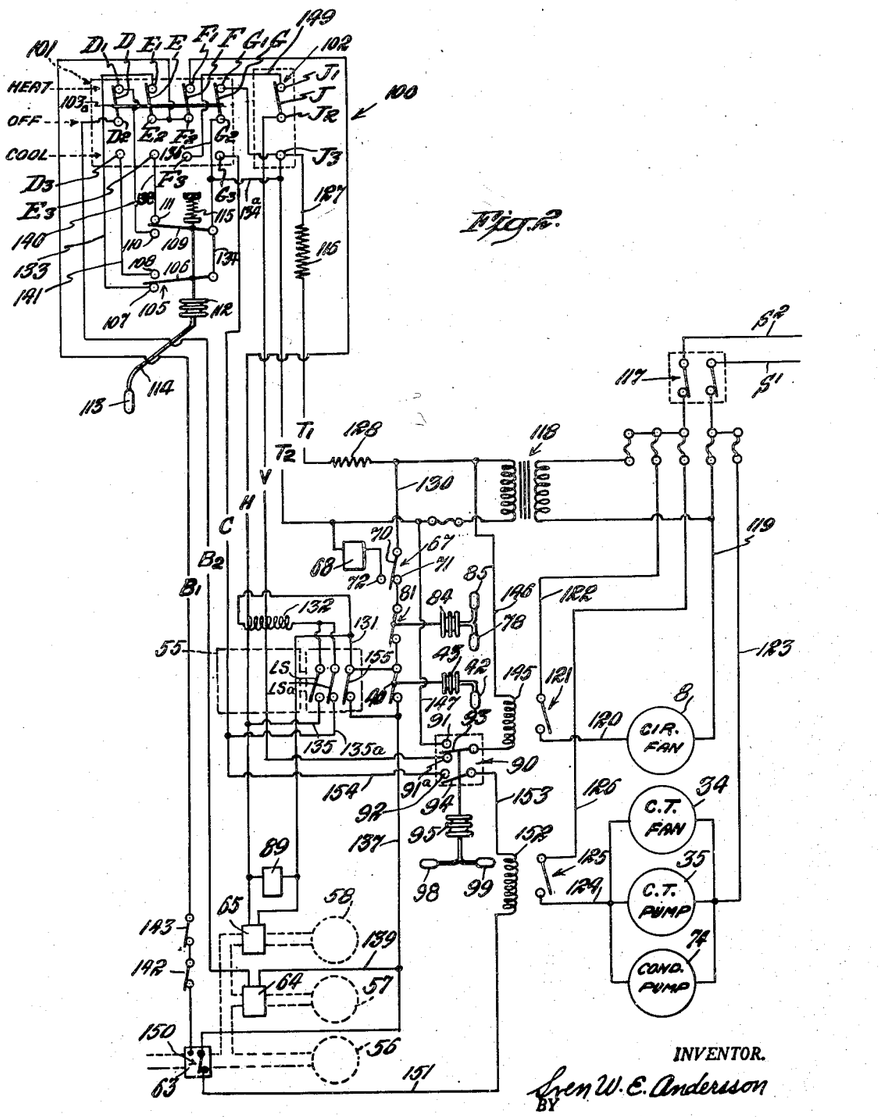
Fig. 2 is a wiring diagram of the electric control system for the air conditioning unit.

The control system for the air conditioning unit including the various operating elements previously described is illustrated diagrammatically in Fig. 2 and includes a selective controller 100 in the enclosure 5 and a plurality of electric circuits. The controller 100 comprises a switch box having a four-pole double-throw switch 101 and a single-pole double-throw switch 102, see Fig. 2. The four poles of the switch 101 are indicated by the reference characters, D, E, F, and G, and the three contacts for each pole are indicated by the reference character for the pole and the subscript 1, 2 and 3, such as $D^1$, $D^2$, and $D^3$, etc. The four poles are mechanically connected by a bar 103a, see Fig. 2, for simultaneous operation by a manually operable lever 103, see Fig. 1. When the four pole switch 101 is in the upper position illustrated in Fig. 2 it connects certain of the branch circuits to render the heating system operative; when moved to the lower position to engage the poles D, E, F, and G with the fixed contacts $D^3$, $E^3$, $F^3$, and $G^3$, it connects certain of the branch circuits to render the refrigeration system operative; and when moved to an intermediate position it disconnects all of the branch circuits to render both the heating and cooling systems inoperative.

Switch 102 has a pole J and fixed contacts $J^1$, $J^2$, and $J^3$, and the pole J is adapted to be operated manually to two positions by a lever 104, see Fig. 1. When the pole J of the switch 102 is in the upper position illustrated in Fig. 2 it connects the blower 8 for joint operation with the selected heating or refrigeration system and when moved to its lower position into engagement with the fixed contact $J^3$, it connects the blower for continuous operation independently of the switch 101.

Also mounted in the switch box of the controller 100 is a thermostatically operated switch means 105 substantially identical with that illustrated in my prior Patent No. 2,381,427 referred to above. The switch means 105, illustrated diagrammatically in Fig. 2, comprises a pair of switches arranged to be actuated in sequential order in two directions of movement. One of the switches has a movable contact 106 and a pair of fixed contacts 107 and 108 at opposite sides thereof and the other switch has a movable contact 109 and a pair of fixed contacts 110 and 111 positioned at its opposite sides. The movable contacts 106 and 109 are adapted to be moved in sequential order by a single thermostat illustrated diagrammatically in Fig. 2 as comprising an expansible bellows 112, a bulb 113 outside of the switch box subjected to the ambient temperature in the enclosure 5 and a capillary tube 114 connecting the bulb and bellows. The bulb 113 contains a volatile liquid which produces a vapor pressure corresponding to the temperature of the ambient to expand the bellows 112. The switches are so arranged with respect to each other that the bellows 112 first actuates the movable contact 109 into engagement with the fixed contact 111 upon a predetermined rise in temperature and thereafter actuates the movable contact 106 into engagement with the fixed contact 108 upon a further predetermined rise in temperature. A spring 115 actuates the movable contacts 106 and 109 successively into engagement with the fixed contacts 107 and 110 upon a fall in the temperature of the ambient. To make the bulb 113 of the thermostat the coldest and therefore the sensitive part to changes in ambient temperature a heater is provided in the switch box comprising an electric resistance element 116.

The electric control system includes line voltage circuits for energizing the motors for the blower 8, cooling tower fan 34 and pump 35 condensate return pump 74, and low voltage circuits for controlling all other elements of air conditioning unit. Electric current is supplied to the control system from the service mains, $S^1$, $S^2$, through a line switch 117 to the primary winding of a step-down transformer 118. The circuit for the blower 8 is connected across the service mains $S^1$ and $S^2$ in parallel with the primary winding of the transformer 118 and comprises the conductor 119 connecting the line $S^1$ to one side of the blower motor, a conductor 120 connecting the other side of the blower motor to a relay switch 121 and a conductor 122 connecting relay switch to the other service line $S^2$. The motors for the cooling tower pump 35, cooling tower fan 34, and condensate return pump 74 are connected in parallel for simultaneous operation and the circuit therefor comprises a conductor 123 connecting the service line $S^1$ to one side of the motors, a conductor 124 connecting the other sides of the motors to a relay switch 125 and a conductor 126 connecting the relay switch to the service line $S^2$. As illustrated, all of the line voltage circuits are protected by suitable fuses.

The resistance element 116 for heating the interior of the control box for switch 100 is connected across the terminals of the step-down transformer 118 by an electric circuit comprising a conductor $T^1$ connecting one terminal of the transformer to one side of the resistance element, a conductor 127 connecting the other side of the resistance to the fixed contact $J^3$ of the switch 102 and a conductor $T^2$ connecting the switch contact $J^3$ to the other terminal of the transformer secondary. Preferably a second resistance 128 is provided in the conductor $T^1$ to adjust the amount of heat produced by the heating element 116.

The control system also includes a first branch circuit H in parallel with the circuit for the heating resistance 116 for initiating operation of the heating system when switch 101 is in the position illustrated in Fig. 2; a second branch circuit C in parallel with the circuit for the resistance element 116 to initiate operation of the refrigeration system when switch 101 is moved to its lowermost position; and a plurality of tertiary circuits $B^1$ and $B^2$ to control the rate of operation of the selected system. The first branch circuit H for the heating system comprises a conductor 130 connected to the conductor $T^1$ adjacent one terminal of the transformer secondary, low water control switch 67 and vent switch 81 arranged in series. Conductor 131 from the switch 81 is connected to one end of field winding 132 of the motor 55, to one side of the magnetically operated water valve 89 for humidifier 12, and to one side of the solenoid 65 of the fuel control valve 62 for the burner 58 in parallel arrangement. The opposite end of the motor field winding 132 is connected by a line 135 including limit switch LS to conductor H. The opposite sides of the water valve 89 and fuel valve 65 are also connected to the conductor H which in turn, is connected to terminal $F^1$ of the selector switch 101. Pole F of switch 101 when in position to select the heating system for operation connects terminal $F^1$ to terminal $F^2$ and terminal $F^2$ being connected to terminal $E^2$ by a suitable jumper continues the circuit to the terminal $E^1$ through the pole E. Terminal $E^1$ is connected by a conductor 133 to contact 107 of the thermostatically operated switch means 105. When the temperature in the enclosure is sufficiently low, the movable contact 106 engages the contact 107 to complete the circuit through conductors 134 and 134a to the conductor $T^2$.

If the refrigeration system is selected for operation by manually actuating the switch 101 to engage its poles D, E, F, and G with the terminal contacts $D^3$, $E^3$, $F^3$, and $G^3$, the second branch circuit C is energized by conductor 130, switches 67 and 81, conductor 131 to one end of the field winding 132 of the motor 55. The opposite end of field winding 132 is connected to the conductor C by a line 135a including limit switch LSa and the conductor C is connected to the terminal contact G³ of the switch 101. The circuit is completed through the pole G and conductors 136, 134a and T².

The plurality of tertiary branch circuits B¹ and B² for controlling the rate of operation of the selected heating or refrigeration system comprises the conductor 130, switches 67, 81 and low temperature cut-out switch 40. A conductor 137 connects switch 40 to one side of the motor 63 for operating the master fuel valve 59 and conductor B¹ connects the opposite side of the valve motor 63 to the terminal contacts E² of the switch 101. When the switch 101 is moved to its upper position illustrated in Fig. 2 to select the heating system for operation a circuit is completed through the pole E, conductor 133, switch contacts 107 and 106 of the switch means 105 and conductors 134, 134a and T². When the switch 101 is moved to its lowermost position to select the refrigeration system for operation, the circuit is completed through the pole E of the switch 101, conductor 138, contacts 111 and 109 of the switch means 105 and conductors 134, 134a and T².

The branch circuit B² includes a conductor 139 connecting the conductor 137 to one side of the solenoid 64 for the fuel valve 61. The opposite side of the solenoid 64 is connected by conductor B² to the terminal contact D² of the switch 101. When the switch 101 is moved to select the heating system for operation the circuit is completed through the pole D, contact terminal D¹, conductor 140, contacts 110 and 109 of the switch means 105 and conductors 134, 134a, and T². When the switch 101 is moved to select the refrigeration system for operation the circuit is completed through the pole D, conductor 141, contacts 108 and 106 of the switch means 105 and conductors 134, 134a and T². As illustrated in Fig. 2 a plurality of safety switches or pilotstats 142 and 143 are provided in the conductor B¹, which are operated by suitable thermostats or the like to open the circuit for the master fuel valve 63 if the pilots for igniting the fuel are extinguished.

The blower 8 is adapted for operation jointly with the selected heating system or refrigeration system or is adapted for operation independently of the heating and refrigeration systems. The branch or ventilating circuit V comprises a relay coil 145 for operating the relay switch 121 in the line circuit as previously described. When the heating system is selected for operation by the switch 101, the circuit for the relay coil 145 comprises a conductor 146 connected between the terminal conductor T¹ of the transformer secondary and relay coil. The opposite end of the relay coil 145 is connected to the movable contact 93 of the delayed action control switch 90. The circuit is completed by a conductor 147 connecting the fixed contact 91 of the delayed action control switch 90 to the other terminal conductor T² of the transformer secondary. As the movable contact 93 of the delayed action control switch 90 is only operated into engagement with the fixed contact 91 when steam has been supplied to the radiator 11, the operation of the blower 8 is independent of the operation of the burners 56, 57 and 58 and is delayed until the heating radiator 11 is hot.

When the refrigeration system is selected for operation by moving the switch 101 to engage the poles D, E, F, and G with fixed contacts D³, E³, F³, and G³, energization of the relay coil 145 is controlled by the thermostatically operated switch means 105 by a circuit including the conductor 146, relay coil 145, contacts 93, 91a of delayed action switch 90 and conductor V connected to the terminal contact J² of the switch 102. With the pole J of the switch 102 in engagement with the fixed contact J¹, the circuit is completed through the conductor 149 connecting fixed contact J¹ to fixed contact F³ of the switch 101, poles F and E connected by a jumper, conductor 138, contacts 111 and 109 of the switch means 105 and conductors 134, 134a, and T². In this way the relay coil 145 is immediately energized to cause simultaneous operation of the blower 8 with the burner 56 when the thermostat switch means 105 calls for cooling. When steam is supplied to the heating chamber 23 of the generator 15 the thermostatic bulb 99 will be heated and will operate through the bellows 95 to engage the movable contact 93 with the fixed contact 91 of the delayed action control switch 90 to complete the circuit directly through conductor 147. However, such shifting of circuits will not interrupt the operation of the blower 8.

When ventilation is desired without heating or cooling, selector switch 101 is moved to its intermediate or "off" position and switch 102 is operated to engage pole J with fixed contact J³. A circuit is then completed from T₁ through conductor 146, relay coil 145, contacts 93, 91a of delayed action control switch 90, conductor V, and pole J to T₂. Completion of the circuit energizes relay coil 145 to close relay switch 121 in the blower circuit.

With the selector switch 101 at its lowermost position to select the refrigeration system for operation, the pump 35 and fan 34 for the cooling tower 33 and the condensate return pump 74 will be brought into operation but their operation will be delayed until steam is supplied to the heating chamber 23 of the generator 15. For this purpose a circuit is provided from the conductor 137 through a switch 150 on the motor 63 for the fuel valve 59 and a conductor 151 to one side of a relay coil 152 for operating the relay switch 125. The opposite side of the relay coil 152 is connected by a conductor 153 to the movable contact 94 of the delayed action switch 90. When steam has been supplied to the heating chamber 23 of the generator 15 of the refrigeration system bulb 99 will be heated to expand bellows 95 to engage the movable contact 94 of the delayed action switch 90 with the fixed contact 92 to complete a circuit through conductor 154 connected to the conductor C, contact G³ and pole G of the selector switch 101, and conductors 136, 134a, and T². The switch 150 is operated by the motor 63 for the master fuel valve 59 and is closed whenever the valve is open and is opened whenever the valve is closed. Thus, operation of the cooling tower 33 and condensate return pump 74 is delayed until steam is supplied to the generator 15 but their operation is stopped when the fuel to the burners is shut off by the master valve 59.

A switch 155 is connected to short circuit the low temperature cut-out switch 40 when the heating system is in operation to prevent a low temperature in the evaporator 11 in the winter time from interfering with the operation of the heating system. The switch 155 is operated to closed position by the motor 55 when the heating system is selected for operation and to open position when the refrigeration system is selected for operation. A preferred embodiment of the invention having now been described in detail, the mode of operation is explained as follows.

For purposes of description it is first assumed that the manual selector switch 101 is positioned for winter conditions to select the heating system for operation as illustrated in Fig. 2. It is also assumed that the temperature of the air in the enclosure 5 is sufficiently low so as to have caused the movable contact 106 of the switch means 105 to be engaged with the fixed contact 107 under the control of the room thermostat 112, 113, 114 and spring 115. Under these conditions the branch circuit H is energized and has caused operation of the motor 55 to the position shown in Fig. 1 and thereby operated the diverter valve 14 to open the steam supply pipe 45 to the radiator 11 and close the supply pipe 30 to the generator 15; operated the gas pressure regulator 66 through the Bowden wire 66a to adjust the rate of fuel flow for heating; and opened limit switch LS to stop the motor, closed switches LSa and 155 to set the motor for its next cycle of operation and short circuited the low temperature cut-out switch 40, respectively. The energization of the branch circuit H has also energized the solenoids 89 and 65 to open the water supply valve for the humidifier 12 and fuel valve 62 for the burner 58.

The branch circuit $B^1$ is also energized which has caused operation of the electric motor 63 to open the master fuel valve 59 so that burners 56 and 58 are in operation to heat the boiler 13. However, it is further assumed that burners 56 and 58 have not been operating for a sufficiently long period of time to generated steam so that the blower 8 is inoperative.

When steam is generated in the boiler 13 it will flow through the diverter valve 14 and supply pipe 45 to the radiator 11. Steam in the radiator 11 will heat the thermostat bulb 98 and expand the bellows 95 to engage the movable contact 93 of the delayed action control switch 90 with the fixed contact 91, see Fig. 2, and thereby energize the relay coil 145. Energization of the relay coil 145 will close the relay switch 121 and energize the line circuit including the motor for the blower 8 connected across the supply mains $S^1$ and $S^2$. Operation of the blower 8 will cause air to be drawn from the enclosure 5 into the conduit 6 and through the filter 9, radiator 11, and humidifier 12. As the air passes through the radiator 11 and humidifier 12 it will be heated and humidified and delivered by the blower 8 to the enclosure 5 through the conduit 7. By delaying operation of the blower 8 until the radiator 11 is hot the circulation of unheated air is prevented.

If the temperature in the enclosure 5 continues to decrease the bellows 112 and spring 115 of the room thermostat will actuate the movable contact 109 of the switch means 105 into engagement with the fixed contact 110 to energize the branch circuit $B^2$ including the solenoid 64 for operating the fuel valve 61. Upon energization of the solenoid 64 fuel valve 61 will open to supply fuel to the burner 57 to increase the amount of heat supplied to the boiler 13 and the rate of steam generation therein.

As the temperature of the air in the enclosure 5 increases predetermined increments, the movable contacts 109 and 106 will be moved by the bellows 112 of the room thermostat to open the branch circuits $B^2$ and $B^1$ successively to first decrease the rate of heat transfer and then discontinue operation of the heating system. The room thermostat continues to operate the switch means 105 in response to changes in the room temperature to operate the heating system intermittently with a step control to vary the rate of heating in accordance with requirements.

If the level of the water in the boiler 13 falls too low the contact 70 of the low water cut-out switch 67 will be actuated by the float 69 out of engagement with the contact 71 to open the branch circuits H, $B^1$ and $B^2$ and into engagement with the contact 72 to close the circuit through the solenoid of the water valve 68 to open the latter and supply make-up water to the boiler 13. When the water level in the boiler 13 rises to the proper level by the addition of make-up water thereto, float 69 will actuate the contact 70 into engagement with the contact 71 to again complete the branch circuits H, $B^1$ and $B^2$. Also if steam escapes through the vent pipe 47 from the radiator 11 the vent switch 81 will be opened by the thermostat 84, 85 to deenergize the branch circuits H, $B^1$ and $B^2$, and the vent switch will close to again energize the branch circuits H, $B^1$ and $B^2$ when steam ceases to flow through the vent pipe.

To adjust the air conditioning unit for summer conditions the selector switch 101 is moved from the position illustrated in Fig. 2 to its opposite or lowermost position to select the refrigeration system for operation by engaging the poles D, E, F, and G with the fixed contacts $D^3$, $E^3$, $F^3$ and $G^3$. Immediately upon operation of the selector switch 101 the branch circuit C is energized including the field winding 132 of the motor 55. Energization of the winding 132 will cause the motor to rotate through 180° and thereby operate the diverter valve 14 to close the steam supply pipe 45 for the radiator 11 and open the steam supply pipe 30 to the generator 15; operate the gas pressure regulator 66 through the Bowden wire 66a to adjust the rate of fuel flow for cooling; and open the limit switch LSa to stop motor, close the limit switch LS to set the motor for its next cycle of operation and open the switch 155, see Fig. 2. When the temperature in the enclosure 5 rises to a predetermined value, movable contact 109 will be operated into engagement with the fixed contact 111 of the switch means 105 by the room thermostat 112, 113 and 114. Closing of the contacts 109 and 111 will energize the branch circuit $B^1$ including the electric motor 63 to open the master fuel valve 59 and close the switch 150. Fuel is then supplied to the burner 56 to heat the boiler 13.

Closing of the contacts 109 and 111 of the switch means 105 also energizes the branch circuit V including the relay coil 145. Relay switch 121 then will close to energize the line circuit for the blower 8. Thus the blower 8 is operated simultaneously with the operation of the burner 56 to cause air to be circulated through the enclosure 5 and conduits 6 and 7 of the air conditioning unit. The circulation of air in the enclosure 5 whether or not the air is cooled by the evaporator 10 gives the occupants of the enclosure the effect of being cooler due to the movement of the air.

When steam is generated in the boiler 13 it will flow through the diverter valve 14 and supply pipe 30 to the generator 15 to initiate operation of the refrigeration system and the evaporation of refrigerant in the evaporator 10 will cool and dehumidify the air passing therethrough. Should the temperature of the enclosure continue to rise the contact 106 of the switch means 105 will be moved into engagement with the fixed contact 108 by the room thermostat 112, 113, 114 to energize the branch circuit B² including the solenoid 64 for the fuel valve 61. Upon energization of the solenoid 64 the fuel valve 61 will be opened to cause operation of the burner 57 and thereby increase the rate of steam generation and the rate of operation of the refrigeration system to cool the air circulated by the blower 8. Upon a decrease in the temperature of the enclosure 5 the movable contacts 109 and 106 of the switch means 105 will be moved successively by the room thermostat 112, 113, 114 to open the branch circuits B² and B¹ to first decrease the rate of operation of the refrigeration system and thereafter discontinue its operation. Thus the refrigeration system is operated intermittently in response to variations in the temperature of the enclosure to maintain its temperature within a predetermined range.

When heating steam is supplied to the generator 15 the thermostat bulb 99 will be heated and thereby expand the bellows 95 to actuate the switch contacts 93 and 94 of the delayed action switch 109 into engagement with the fixed contacts 91 and 92. The closing of the contacts 91 and 93 merely shifts the circuit for energizing the relay coil 145 without interrupting the operation of the blower 8. Engagement of the contact 94 with the contact 92 of the delayed action control switch 90, however, completes a circuit through the relay coil 152 to close the relay switch 125. Closing of the relay switch 125 will energize the line circuit including the motors for the cooling tower fan 34, cooling tower pump 35, and condensate return pump 74. It will be observed, therefore, that the control system of the present invention delays the operation of the cooling tower 33 and condensate return pump 74 until operation of the refrigeration system has been initiated by supplying steam to the generator 15. The reason for the delayed operation of the cooling tower is to prevent cooling down the absorber 17 and condenser 16 before refrigerant vapor is expelled in the generator 15 which might cause operation of the low-temperature cut-out switch 40 when refrigerant is first introduced into the evaporator 10 if the cooling water is especially cold. The condensate return pump 74 will withdraw condensate from the bottom of the heating chamber 23 of the generator 15 and return it to the boiler 13. When the room thermostat operates the switch means 105 to discontinue operation of the refrigeration system, the branch circuit B¹ will be deenergized and the master fuel valve 59 will close and open the switch 150. Upon opening of the switch 150 the circuit for the relay coil 152 is open whereby the relay switch 125 opens to discontinue operation of the motors for the cooling tower fan 34, cooling tower pump 35, and condensate return pump 74. Thus, the operation of the cooling tower 33 and condensate return pump 74 are delayed until heating steam is supplied to generator 15 to prevent excessive initial cooling of the absorber 17 and condenser 16 but the operation of the cooling tower and condensate pump is discontinued simultaneously with the shutting off of fuel to the boiler 13 to prevent excessive concentration of solution in the generator after pumping stops. However, due to interlocking arrangement of the switch 150 with the master fuel valve 63 cooling water will continue to be delivered by the cooling tower circulating pump 35 if the master fuel valve fails to close.

If for any reason the temperature in the evaporator 10 falls below a predetermined value during operation of the refrigeration system, the low temperature cut-out switch 40 will be operated to stop the operation of the refrigeration system. When the temperature of the evaporator again rises above a predetermined low value the operation of the refrigeration system will again be initiated. Also the operation of the refrigeration system will be interrupted if steam escapes through the vent pipe 31 by opening the vent switch 81 as previously described.

It is many times desirable especially in the spring and fall seasons to operate the blower 8 independently of the heating and refrigeration system to ventilate the enclosure 5. For this purpose the switch 101 will be moved to a central or neutral position and the switch 102 manually operated to engage the pole J with the fixed contact J³. The branch circuit V including the relay coil 145 then will be energized independently of the branch circuits H, C, B¹ and B². Upon energization of the relay coil 145 the relay switch 121 will be closed to energize the line circuit including the blower 8. Operation of the blower 8 will cause circulation of air in the enclosure 5 and conduits 6 and 7 of the air conditioning unit under the control of the manual switch 105.

It now will be observed that the present invention provides a control system for an air conditioning unit having a single double-throw switch for manually selecting the heating system for operation when moved to one of its two positions and selecting the refrigeration system for operation when moved to the other of its two positions. It also will be observed that the control system operates automatically to control the selected system to maintain a predetermined temperature in the enclosure. It further will be observed that the control system delays operation of the blower until the radiator is hot when the heating system is selected for operation and delays operation of the cooling water supply means and condensate return pump until the generator is hot when the refrigeration system is selected for operation.

While a preferred embodiment of the invention is illustrated and described herein, it is to be understood that modifications may be made in the control system and in the construction and arrangement of the parts of the air conditioner to be controlled without departing from the spirit or scope of the invention.

What is claimed is:

1. An air conditioning unit comprising a heating system having a heating element, a refrigeration system having a heated element and a cooling element, a blower for circulating air to be conditioned over the heating and cooling elements, means for supplying cooling water to the refrigeration system, a control having means for selecting the heating system or refrigeration system for operation, and a device cooperating with said selective means for delaying operation of the blower until the heating element is hot when the heating system is selected for operation and delaying operation of the cooling water supply means until the heated element is hot when the refrigeration system is selected for operation.

2. An air conditioning unit comprising a heating system having a heating element, a refrigeration system having a heated element and a cooling element, a blower for circulating air to be conditioned over the heating and cooling elements, a cooling tower for supplying cooling water to the refrigeration system, and a control having means for selecting the heating system or refrigeration system for operation, an element responsive to the temperature of the air to be conditioned for regulating the operation of the selected heating or refrigeration system, and a device responsive to the temperature of the heating element of the heating system and the heated element of the refrigeration system for delaying operation of the blower until the heating element is hot when the heating system is selected for operation and delaying operation of the cooling tower until the heated element is hot when the refrigeration system is selected for operation.

3. An air conditioning unit comprising a heating system having a heating element, a heat operated refrigeration system having a generator and a cooling element, a blower for circulating air to be conditioned over the heating and cooling elements, means for supplying cooling water to the refrigeration system, a boiler for supplying a heating medium to the heating system or heat operated refrigeration system, and a control including means for selecting the heating system or refrigeration system for operation, an element responsive to the temperature of the air to be conditioned for controlling the operation of the boiler, and a thermostat responsive to the temperature of the heating element and generator for delaying operation of the blower until the heating element is hot when the heating system is selected for operation and delaying operation of the cooling water supply means until the generator is hot when the refrigeration system is selected for operation.

4. An air conditioning unit comprising a heating system having a heating element, a heat operated refrigeration system having a generator and a cooling element, a blower for circulating air to be conditioned over the heating and cooling elements, a cooling tower for supplying cooling water to the refrigeration system, a boiler for supplying a heating medium to the heating and refrigeration systems, fuel burners for heating the boiler, and a control including means for selecting the heating system or refrigeration system for operation, an element responsive to the temperature of the air to be conditioned for controlling the operation of the fuel burners, and a thermostat responsive to the temperature of the heating element and generator for delaying operation of the blower until the heating element is hot when the heating system is selected for operation and delaying operation of the cooling tower until the generator is hot when the refrigeration system is selected for operation.

5. In an air conditioning unit, a heating system having a heating element, a heat operated refrigeration system having a cooling element, an electric control circuit having a branch for selecting the heating system for operation, a branch for selecting the refrigeration system for operation and branches for initiating operation of the selected system, a double throw switch in said circuit operative at one of its two positions to connect the branches controlling the heating system for energization and operative at the other of its two positions to connect the branches controlling the refrigeration system for energization, a second switch in the circuit and cooperating with the double throw switch to complete a circuit through one selected branch when moved in one direction and complete a circuit through another selected branch when moved in the other direction, and a thermostat responsive to the temperature of the air to be conditioned for operating the second switch to initiate operation of the selected system.

6. In an air conditioning system, a heating system having a heating element, a heat operated refrigeration system having a cooling element, a single source of heat, an electric control circuit having a selecting branch operative when energized to direct heat from said source to the heating system, a selecting branch operative when energized to direct heat from said source to the heat operated refrigeration system and regulating branches operative when energized to supply heat, a manually operable double throw switch in said circuit operative at one of its two positions to connect one selecting branch circuit and the regulating branch circuits for energization and operative at the other of its two positions to connect the other selecting branch circuit and the regulating branch circuits for energization, a second switch means in the circuit operable upon movement in opposite directions and cooperating with the double throw switch in either of its two selected positions to complete circuits through the regulating branches in the same sequence, and a thermostat responsive to the temperature of the air to be conditioned for operating the second switch means in opposite directions to initiate operation of the selected system.

7. In an air conditioning unit, a heating system having a heating element, a heat operated refrigeration system having a cooling element, a single source of heat, means for varying the rate at which heat is supplied, movable means for selectively supplying heat from said source to operate the heating system or the heat operated refrigeration system, an electric control circuit having a first branch for operating the movable means when energized to select the heating system for operation, a second branch for operating the movable means when energized to select the refrigeration system for operation, and a plurality of tertiary branches for operating the heat varying means in a series of steps to control the rate of operation, a double throw switch in said circuit operative at one of its two positions to connect the first branch and plurality of tertiary branches for energization and operative at the other of its two positions to connect the second branch and plurality of tertiary branches for energization, a second switch means in the circuit having a plurality of contacts and cooperating with the double throw switch to complete a circuit through the plurality of tertiary branches in succession when moved in one direction and complete a circuit through plurality of tertiary branches in succession when moved in the opposite direction, and a thermostat responsive to the temperature of the air to be conditioned for operating the second switch to initiate operation of the selected system and control the rate of operation.

8. In an air conditioning unit, a heating system having a heating element, a heat operated refrigeration system having a cooling element, a blower for circulating air to be conditioned over the heating and cooling elements, an electric control circuit having a first branch for initiating operation of the heating system when energized, a second branch for initiating operation of the cooling system when energized, and a third branch for initiating operation of the blower when energized, a double throw switch in said circuit operative at one of its two positions to connect the first branch for energization and operative at the other of its two positions to connect the second and third branches for energization, a second switch in the circuit and cooperating with the double throw switch to complete a circuit through the first selected branch when moved in one direction and complete a circuit through the selected second and third branches when moved in the other direction, and a thermostat responsive to the temperature of the air to be conditioned for operating the second switch to initiate operation of the selected system.

9. In an air conditioning unit, a heating system having a heating element, a heat operated refrigeration system having a cooling element, a blower for circulating air to be conditioned over the heating and cooling elements, an electric control circuit having a first branch for initiating operation of the heating system when energized, a second branch for initiating operation of the cooling system when energized, and a third branch for initiating operation of the blower when energized, a double throw switch in said circuit operative at one of its two positions to connect the first branch for energization and operative at the other of its two positions to connect the second and third branches for energization, a second switch in the circuit and cooperating with the double throw switch to complete a circuit through the selected first branch when moved in one direction and complete a circuit through the selected second and third branches when moved in the other direction, a thermostat responsive to the temperature of the air to be conditioned for operating the second switch to initiate operation of the selected system, and a circuit for initiating operation of the blower independently of the first two switches including a thermostatically operated switch responsive to the temperature of the heating element to delay operation of the blower until the heating element is hot when the heating system is selected for operation.

10. In an air conditioning unit, a heating system having a heating element, a heat operated refrigeration system having a heating chamber and a cooling element, means for circulating cooling water through the heat operated refrigeration system, an electric control circuit having a first branch for initiating operation of the heating system when energized, a second branch for initiating operation of the refrigeration system when energized, and a third branch for controlling the supply of cooling water to the refrigeration system, a double throw switch in said circuit operative at one of its two positions to connect the first branch for energization and operative at the other of its two positions to connect the second branch for energization, a second switch in the circuit and cooperating with the double throw switch to complete a circuit through the first selected branch when moved in one direction and complete a circuit through the second selected branch when moved in the other direction, a thermostat responsive to the temperature of the air to be conditioned for operating the second switch to initiate operation of the selected system, and a thermostatically operated switch responsive to the temperature in the heating chamber of the refrigeration system to energize the third branch of the circuit independently of the first two switches to delay the supply of cooling water to the refrigeration system until heat has been supplied thereto.

11. In an air conditioning unit, a heating system having a heating element, a heat operated refrigeration system having a heating chamber and a cooling element, a cooling tower for supplying cooling water to the refrigeration system, said cooling tower having operating elements for cooling the water and delivering the cooled water to the refrigeration system, an electric control circuit having a first branch for initiating operation of the heating system when energized, a second branch for initiating operation of the refrigeration system when energized, and a third branch for initiating operation of the cooling tower when energized, a double throw switch in said circuit operative at one of its two positions to connect the first branch for energization and operative at the other of its two positions to connect the second branch for energization, a second switch in the circuit and cooperating with the double throw switch to complete a circuit through the first selected branch when moved in one direction and complete a circuit through the second selected branch when moved in the other direction, a thermostat responsive to the temperature of the air to be conditioned for operating the second switch, and a thermostatically operated switch responsive to the temperature in the heating chamber of the refrigeration system to energize the third branch of the circuit independently of the first two switches to delay operation of the cooling tower until heat has been supplied to the refrigeration system.

12. In an air conditioning system comprising heat exchange means, a blower for flowing air to be conditioned over said heat exchange means, a source of heat, selective control means for adjusting the system for operation by heat from said source to supply either a heating medium or a cooling medium to said heat exchange means, apparatus for removing heat from the system when the latter is adjusted for supplying cooling medium to the heat exchange means, and a thermostatic device for delaying operation of both the blower and said heat removing apparatus, respectively, under supervision of said selective control means.

SVEN W. E. ANDERSSON.

REFERENCES CITED

The following references are of record in the file of this patent:

UNITED STATES PATENTS

| Number | Name | Date |
|---|---|---|
| 1,665,801 | Sweatt | Apr. 10, 1928 |
| 2,306,149 | Andersson | Dec. 22, 1942 |
| 2,381,427 | Andersson | Aug. 7, 1945 |